(12) United States Patent
Kashyap

(10) Patent No.: US 6,438,128 B1
(45) Date of Patent: Aug. 20, 2002

(54) ALTERNATE USE OF DATA PACKET FIELDS TO CONVEY INFORMATION

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/850,850

(22) Filed: May 8, 2001

(51) Int. Cl.⁷ ............................................... H04L 12/28
(52) U.S. Cl. ..................... 370/389; 370/445; 359/128
(58) Field of Search ................................. 370/389, 445, 370/351, 395.1, 395.52, 395.5, 367, 395.53, 395.6, 387, 396–397, 400–401, 419–420, 436; 359/115, 117–118, 120–121, 123–124, 128

(56) References Cited

U.S. PATENT DOCUMENTS 6,199,137 B1 * 3/2001 Aguilar et al.
6,243,787 B1 * 6/2001 Kagan et al.

* cited by examiner

Primary Examiner—William Luther
(74) Attorney, Agent, or Firm—Law Offices of Michael Dryja

(57) ABSTRACT

The alternate use of data packet fields to convey other packet information is disclosed. A data packet is sent by a first adapter, such as a host channel adapter (HCA), to a second adapter, such as a target channel adapter (TCA), over a network, such as input/output (I/O) network like an Infini-Band I/O network. The packet is sent for routing over another network, such as a communication network like an Ethernet network. The packet has a first part intended to signify a packet type, but actually conveys other packet information. The first part may be intended to have a value greater than or equal to a predetermined number to signify the type, but actually have a value less than the predetermined number to convey other packet information. The first packet part may be a raw datagram header, and may have an Ethertype field.

20 Claims, 5 Drawing Sheets

RAW HEADER

RAW HEADER

304

ALTERNATE USE OF DATA PACKET FIELDS TO CONVEY INFORMATION

BACKGROUND OF THE INVENTION

1. Technical Field

This invention relates generally to sending data packets over a first network for routing over a second network, and more particularly to sending such data packets where the first network is an input/output (I/O) network, such as an InfiniBand network, and the second network is a communication network, such as an Ethernet network.

2. Description of the Prior Art

Input/output (I/O) networks, such as system buses, can be used for the processor of a computer to communicate with peripherals such as network adapters. However, constraints in the architectures of common I/O networks, such as the Peripheral Component Interface (PCI) bus, limit the overall performance of computers. Therefore, new types of I/O networks have been proposed.

One new type of I/O network is known and referred to as the InfiniBand network. The InfiniBand network replaces the PCI or other bus currently found in computers with a packet-switched network, complete with one or more routers. A host channel adapter (HCA) couples the processor to a subnet, whereas target channel adapters (TCAs) couple the peripherals to the subnet. The subnet includes at least one switch, and links that connect the HCA and the TCAs to the switches. For example, a simple InfiniBand network may have one switch, to which the HCA and the TCAs connect through links. Topologies that are more complex are also possible and contemplated.

InfiniBand networks can interconnect with communication networks. For instance, an Ethernet network adapter may be installed that enables communication over an Ethernet network, which is a common type of communication network. The network adapter has its own TCA for coupling to an InfiniBand network. The InfiniBand specification provides a raw datagram mode of communication to bridge packets received from an Ethernet network for transmission over an InfiniBand network, and vice-versa.

A raw datagram, or packet, header has two two-octet (sixteen-bit) fields. The first field is an Ethertype field, and also is known as the length/type field. The second field is reserved by the InfiniBand specification. According to the IEEE 802.3 standard, and the InfiniBand specification since it refers to this standard, the Ethertype field can have a value greater than or equal to 1536 decimal, or 0x600 hexadecimal, to signify data packet type. Values are registered with and assigned by the Internet Assigned Numbers Authority (IANA), so that there is common understanding as to the meaning of different values. The packets utilize the IEEE 802.3 Ethertype values more specifically to distinguish their communication protocol type.

The Ethertype values are defined in relation to network layering. In common networking terminology, local-area-network (LAN) technologies, such as Ethernet, Token Ring, and so on, are referred to as at layer 2. Communication protocols that utilize layer 2 are referred to as upper-layer protocols at layer 3. Such protocols include the Internet Protocol (IP), including both versions 4 and 6 thereof, the Address Resolution Protocol (ARP), the Internet Packet Exchange (IPX) protocol, the System Network Architecture (SNA) protocol, and so on. The 802.3 Ethertype values in particular identify the layer 3 data payload that is being transmitted in a given packet. For example, the Ethertype value 0x800 signifies IP version 4, the value 0x806 signifies ARP, the value 0x80D5 signifies SNA over Ethernet, and so on.

Layer 2 communication protocols, or media, that are commonly used include Ethernet, both according to the Dec-Intel-Xerox (DIX) and IEEE 802.3 standards, and Token Ring, which is according to the IEEE 802.5 standard. Other common layer 2 communication protocols are Asynchronous Transfer Mode (ATM), which is defined in the Request for Comment (RFC) 2225 governed by the Internet Engineering Task Force (IETF), and LAN Emulation (LANE) over ATM. Another common layer 2 protocol is Token Bus, which is according to the IEEE 802.4 standard.

Some layer 2 protocols further fall under the IEEE 802.2 standard, such as 802.3 Ethernet, 802.5 Token Ring, and 802.4 Token Bus, which require use of a logical link control (LLC) header and a System Network Architecture Protocol (SNAP) header. The SNAP header includes a field for an Ethertype value. DIX Ethernet does not use LLC or SNAP headers, but its header nevertheless includes a field for an Ethertype value.

For most types of layer 2 communication, compliance is generally required with either the 802.2 SNAP standard, the 802.2 LLC standard, or both standards. This means that SNAP and/or LLC header information must be conveyed within InfiniBand networks for true bridging between Ethernet communication networks and InfiniBand networks to occur. However, the InfiniBand standard specifies only the IEEE 802.3 standard for the inclusion of Ethernet-specific information. Because the IEEE 802.3 standard does not provide for conveyance of SNAP and LLC header information, Ethernet communication that requires the use of such information cannot be properly sent over InfiniBand networks. Ethertype values also cannot signify the encapsulation of layer 2 packets within Ethernet or 802.2 SNAP packets. For example, Ethertype values cannot specify that a packet is a Token Ring packet, because this situation does not arise in Ethernet or 802.2 SNAP networks.

The use of 802.3 Ethertype by the InfiniBand specification, therefore, restricts packets transferred from a non-InfiniBand network to an InfiniBand network to comply only with upper-layer protocols. That is, the information contained in the Ethertype field of the raw packet headers is insufficient for true bridging to occur, because layer 2 communication is not restricted to that which complies only with the IEEE 802.3 standard. This shortfall of the InfiniBand specification curtails its utility in situations where non-802.3 data packet information must be conveyed, and for which there is no place provided by the InfiniBand specification.

To overcome this limitation, TCAs may be made more intelligent, and instructed by control messages as to further information regarding the data packets that are being transmitted. However, this adds complexity to the TCAs. Another potential solution is to encapsulate further information in the data packets themselves. This solution has been used in other architectures, such as LANE over ATM networks. In this case, LANE over ATM specifies encapsulating Ethernet data packets with additional information in larger packets. This packet-inside-a-packet solution has shortcomings, however.

For instance, in the case of an InfiniBand network, the HCA would have to wrap, or encapsulate, the Ethernet data packets in the larger packets before sending them over the InfiniBand network. The TCA would then have to unwrap, or unencapsulate, the Ethernet data packets before relaying them to the Ethernet network adapter. This adds a layer of complexity to both the TCA and HCA, likely resulting in additional cost to implement an InfiniBand network in a computer. Furthermore, this approach uses additional InfiniBand network bandwidth, which is generally always disadvantageous.

For these described reasons, as well as other reasons, there is a need for the present invention.

SUMMARY OF THE INVENTION

The invention relates to the alternate use of data packet fields to convey information. A method of the invention receives a packet of data by a second adapter from a first adapter over a first network. The packet of data has at least a first part intended to signify a type of the packet of data, but actually conveys other information regarding the packet of data. The method further includes routing the packet of data by the second adapter over the second network.

A computerized system of the invention includes an InfiniBand input/output (I/O) network, a host channel adapter (HCA) and a target channel adapter (TCA) coupled to the InfiniBand I/O network, and a network adapter coupled to the TCA and to a communication network. The HCA is capable of sending raw datagram headers for routing over the communication network. The headers have a field intended to have a value greater than or equal to a predetermined number to signify a data packet type, but employs a value less than the predetermined number to convey other information regarding the data packet. The TCA is capable of receiving the headers sent by the HCA, whereas the network adapter is capable of routing the headers received by the TCA over the communication network.

An article of manufacture of the invention includes a computer-readable signal bearing medium and a raw datagram header stored in the medium through an input/output (I/O) network for ultimate routing over a communication network. The header has a field. The field is intended to signify a data packet type, but actually conveys other packet information.

Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
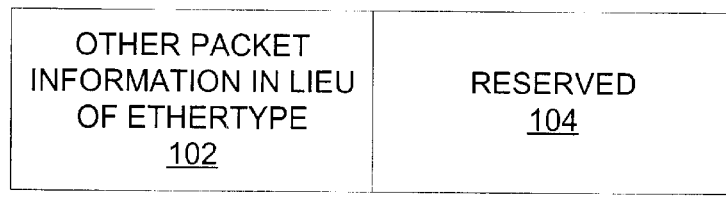
FIG. 1 is a diagram of the raw datagram header used by the preferred embodiment to convey packet information in lieu of Ethertype, and is suggested for printing on the first page of the issued patent.
Figure 1:
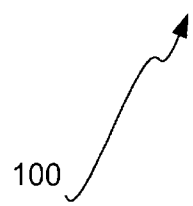

In the preferred embodiment of the invention, a raw datagram, or packet, header 100 as shown in FIG. 1 is employed to convey communication network information over an InfiniBand network, between a host channel adapter (HCA) on the network, and a target channel (HCA) on the network that is coupled to a network adapter. The communication network may be one or more of an 802.2 local area network (LAN), an Ethernet network, or another type of network. The header 100 is an Ethertype header as specified by the IEEE 802.3 standard. The header 100 has a first field 102 and a second field 104, the latter which is reserved by the standard and not otherwise used by the preferred embodiment. According to the 802.3 standard, the field 102 is a two-octet field that specifies Ethertype by a value greater than or equal to 1536 decimal, or 0×600 hexadecimal. These values are administered and assigned by the Internet Assigned Numbers Authority (IANA).

However, the preferred embodiment uses the field 102 to instead convey information regarding packets other than Ethertype. This is accomplished by setting the value in the field 102 to less than 1536 decimal. By having different values less than 1536 signify different information regarding the packets sent over the InfiniBand network, the preferred embodiment provides for this information to be conveyed within an already existing packet structure. Examples of packet information that may be sent within the field 102, in lieu of having the field 102 specify Ethertype in accordance with the IEEE 802.3 standard, include 802.2 sub-network attachment point (SNAP) and logical link control (LLC) header information, as well as other information.

Technical Background

Figure 2:
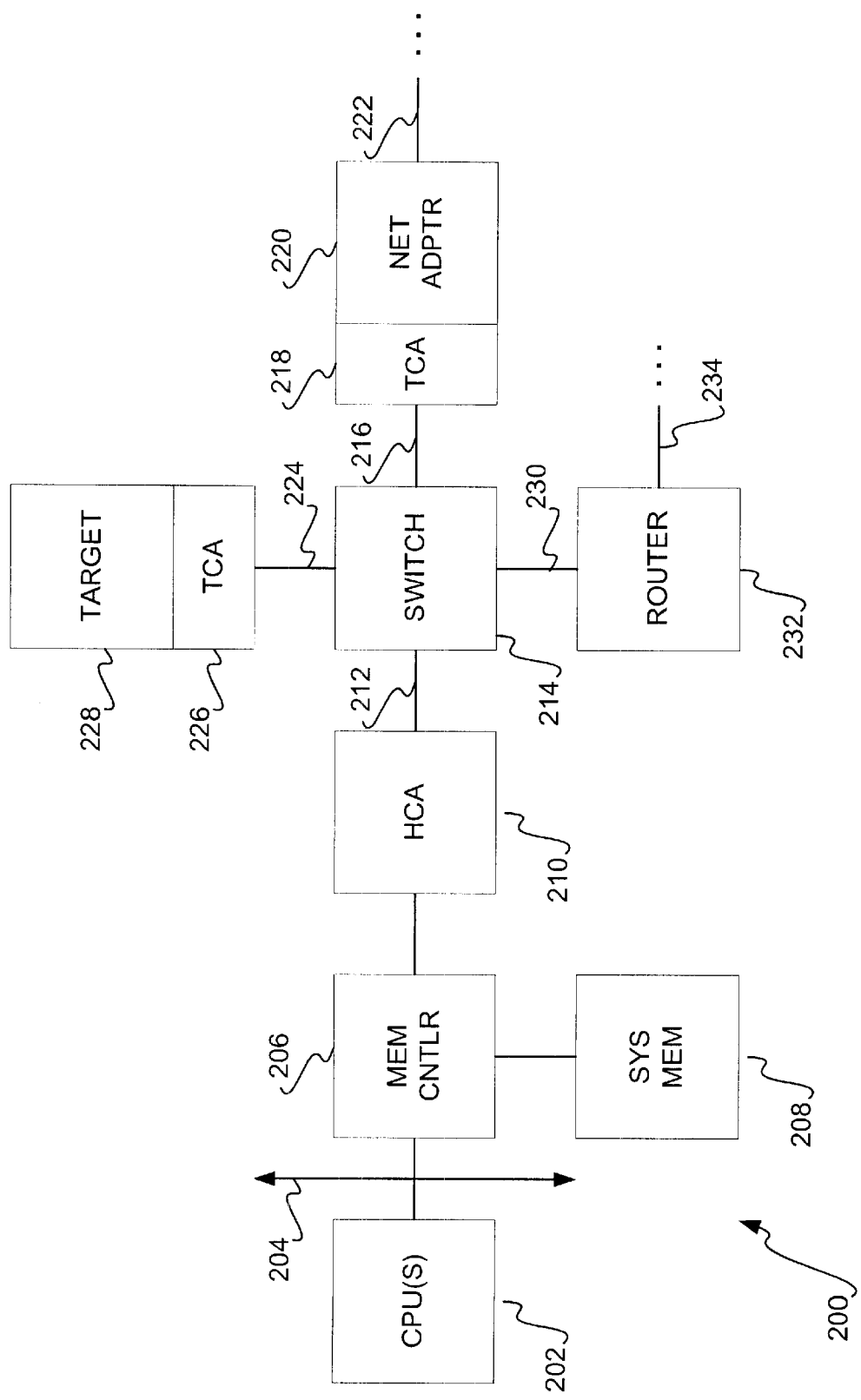
FIG. 2 is a diagram of an InfiniBand network in conjunction with which embodiments of the invention may be implemented.

FIG. 2 shows an example InfiniBand network architecture 200 in conjunction with which embodiments of the invention may be implemented. An InfiniBand network is one type of input/output (I/O) network. The invention can be implemented with other types of I/O networks, too. Processor(s) 202 are coupled to a host interconnect 204, to which a memory controller 206 is also coupled. The memory controller 206 manages system memory 208. The memory controller 206 is also connected to a host channel adapter (HCA) 210. The HCA 210 allows the processor and memory sub-system, which encompasses the processor(s) 202, the host interconnect 204, the memory controller 206, and the system memory 208, to communicate over the InfiniBand network.

The InfiniBand network in FIG. 2 is particularly what is referred to as a subnet, and encompasses InfiniBand links 212, 216, 224, and 230, and an InfiniBand switch 214. There may be more than one InfiniBand switch, but only the switch 214 is shown in FIG. 2. The links 212, 216, 224, and 230 enable the HCA and the target channel adapters (TCAs) 218 and 226 to communicate with one another, and also enables the InfiniBand network to communicate with other InfiniBand networks, through the router 232. Specifically, the link 212 connects the HCA 210 to the switch 214. The links 216 and 224 connect the TCAs 218 and 226, respectively, to the switch 224. The link 230 connects the router 232 to the switch 214.

The TCA 218 is the target channel adapter for a specific peripheral, in this case an Ethernet network adapter 220. A TCA may house multiple peripherals, such as multiple network adapters, SCSI adapters, and so on. The TCA 218 enables the network adapter 220 to send and receive data over the InfiniBand network. The adapter 220 itself allows for communication over a communication network, particularly an Ethernet network, as indicated by line 222. Other communication networks are also amenable to the invention.

The TCA 226 is the target channel adapter for another peripheral, the target peripheral 228, which is not particularly specified in FIG. 2. The router 232 allows the InfiniBand network of FIG. 2 to connect with other InfiniBand networks, where the line 234 indicates this connection.

InfiniBand networks are packet switching I/O networks. Thus, the processor(s) 202, through the interconnect 204 and the memory controller 206, sends and receives data packets through the HCA 210. Similarly, the target peripheral 228 and the network adapter 220 send and receive data packets through the TCAs 226 and 218, respectively. Data packets may also be sent and received over the router 232, which connects the switch 214 to other InfiniBand networks. The links 212, 216, 224, and 230 may have varying capacity, depending on the bandwidth needed for the particular HCA, TCA, and so on, that they connect to the switch 214.

InfiniBand networks provide for communication between TCAs and HCAs in a variety of different manners, which are briefly described here for summary purposes only. Like other types of networks, InfiniBand networks have a physical layer, a link layer, a network layer, a transport layer, and upper-level protocols. As in other types of packet-switching networks, in InfiniBand networks particular transactions are divided into messages, which themselves are divided into packets for delivery over an InfiniBand network. When received by the intended recipient, the packets are reordered into the constituent messages of a given transaction. InfiniBand networks provide for queues and channels at which the packets are received and sent.

Furthermore, InfiniBand networks allow for a number of different transport services, including reliable and unreliable connections, reliable and unreliable datagrams, and raw packet support. In reliable connections and datagrams, acknowledgments and packet sequence numbers for guaranteed packet ordering are generated. Duplicate packets are rejected, and missing packets are detected. In unreliable connections and datagrams, acknowledgments are not generated, and packet ordering is not guaranteed. Duplicate packets may not be rejected, and missing packets may not be detected.

Figure 3:
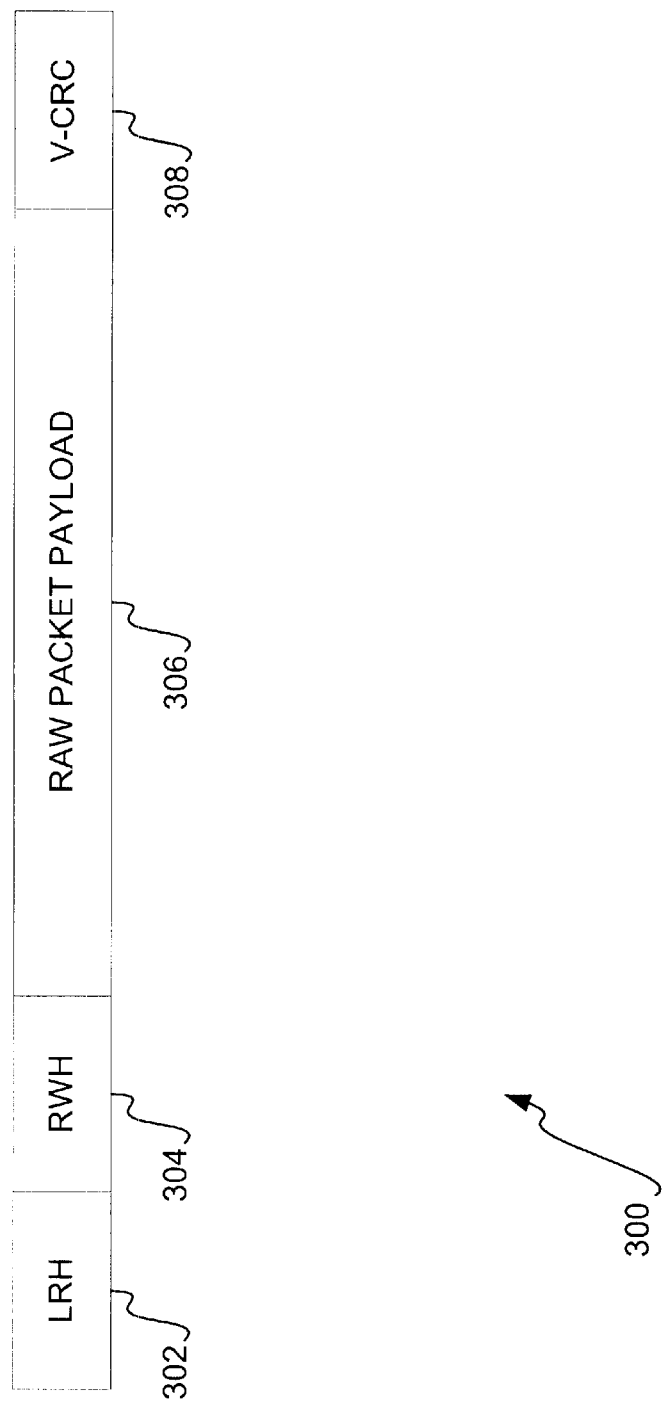
FIG. 3 is a diagram of the ordering of raw packets for transmission over an InfiniBand network.

The preferred embodiment utilizes the raw packet support of InfiniBand networks, which is now described in detail. FIG. 3 shows the packet ordering 300 for sending raw packets. The local route header 302 indicates the TCA or router to which the raw packet is intended to be sent. The raw header 304 is the actual header for the raw data, and is what the preferred embodiment specifically utilizes to convey packet information. The data of the raw packet is included in the raw packet payload 306. The V-CRC 308 is a cyclical redundancy checking value so that the recipient of the packet can verify that the packet was received correctly.

When an HCA wishes to send a raw packet to a TCA for a network adapter, it adds the local route header 302 to specify the TCA. The V-CRC 308 is automatically determined by the HCA, based on the information contained in the raw header 304 and the raw packet payload 306. The raw data packet itself is made up of the raw header 304 and the raw packet payload 306. The HCA then sends this complete packet of information over its InfiniBand link, where it is routed by one or more InfiniBand routers over one or more other InfiniBand links for receipt by the specified TCA. The TCA verifies the correctness of the packet by using the V-CRC 308, removes the local route header 302 and the raw header 304, and conveys the resulting raw data packet to the network adapter. The network adapter then routes the raw data packet over a communication network, such as an Ethernet network, as appropriate.

The InfiniBand switches only switch raw packets based on the local route header 302, and do not parse anything beyond the local route header (LRH) 302. Raw packets are thus transmitted without the decoding of any protocol headers. The destination TCA or network adapter is responsible for decoding the raw packets. The packets themselves are protected only by the V-CRC 308 over the InfiniBand subnet. Otherwise, the packets flow through the InfiniBand subnet like any other InfiniBand data packet. In this way, raw packets are transmitted over InfiniBand networks.

Figure 4:
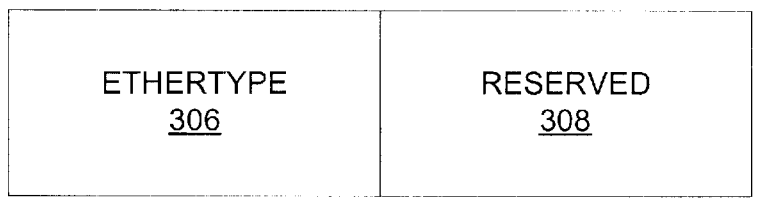
FIG. 4 is a diagram showing in more detail the raw datagram header of FIG. 3.
Figure 4:
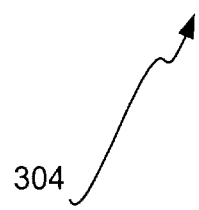

FIG. 4 is a diagram showing in more detail the raw header 304 of FIG. 3. The raw header 304 has two two-octet fields, an Ethertype field 306, and a reserved field 308. The destination TCA or network adapter is responsible for decoding the Ethertype field 306. The Ethertype field 306 is meant to have a value equal to or greater than 1536 to convey Ethertype. However, in the case of the preferred embodiment of the invention, as has been described in relation to FIG. 1, the Ethertype field 306 is instead used to convey other data packet information, by having a value less than 1536.

Information Conveyed in the Ethertype Field

Embodiments of the invention can use the Ethertype field 306 of FIG. 4 to convey a variety of different raw data packet information. For example, data packets that are compliant with Dec-Intel-Xerox (DIX) or IEEE 802.2 LAN implementations, as known within the art, may require protocol type, LLC header, SNAP header, or length field information. The Ethertype field 306 may be set to values of zero or one to indicate that the raw data packets being transmitted are in accordance with DIX or 802.2 frames, respectively.

As another example, the Ethertype field 306 may be set to values of two or three to turn on multicasting or turn on promiscuous mode, respectively. Multicasting allows one packet to be sent from the network adapter to all the other network adapters in the attached communication network, whereas in promiscuous mode the network adapter captures all data packets received. As still another example, the Ethertype field may be set to other values to turn on virtual local area network (VLAN) support, or to turn on support for jumbo frames when utilizing gigabit Ethernet network adapters. In this way, a common set of values less than 1536 can be used to control network adapters, allowing the same adapters to be used for 802.3 and non-802.3 Ethernet communications. The use of Ethertype values for indicating 802.2 LAN or DIX Ethernet frames also allows the A transmission to a destination media access controller (MAC) address without having to convey this address to the TCA, and hence the network adapter, in a separate message.

As a specific example of data packets that are DIX compliant, the local route header (LRH) 302 of FIG. 3 specifies the TCA of the network adapter. The raw header (RWH) 304 is set to zero. More specifically, the Ethertype field 306 of the RWH 304, as shown in FIG. 4, is set to zero. The raw packet payload 306 of FIG. 3 specifies the destination Ethernet address, the source Ethernet address, the protocol, and the actual data. The V-CRC 308 is determined by the HCA, and used by the TCA to ensure that the packet was sent correctly.

As a specific example of data packets that are 802.2-compliant, the LRH 302 of FIG. 3 again specifies the TCA of the network adapter, whereas the RWH 304 is set to one. More specifically, the Ethertype field 306 of the RWH 304, as shown in FIG. 4, is set to one. The raw packet payload 306 of FIG. 3 specifies the destination Ethernet address, the source Ethernet address, the length, the values 0×AA, 0×AA, and 0×03, as required by the IEEE 802.2 standard, as known within the art, and the actual data. The V-CRC 308 is again determined by the HCA, and used by the TCA to ensure that the packet was sent correctly.

As a specific example of turning on multicasting, the LRH 302 of FIG. 4 still specifies the TCA of the network adapter. The RWH 304 is set to two. More specifically, the Ethertype field 306 of the RWH 304, as shown in FIG. 4, is set to two. In the raw packet payload 306 of FIG. 3, the destination or source address that matches the multicast address is set to the multicast address, whereas the other of these two addresses is set to zero, or null. The V-CRC 308 is still determined by the HCA, and used by the TCA to ensure that the packet was sent correctly.

Alternative Embodiments of Conveying Information in the Ethertype Field

Besides setting specific values less than 1536 in the Ethertype field to convey information other than Ethertype, the Ethertype field can be employed in other ways to also convey such information. For example, nine bits are available in the Ethertype field for conveying information other than Ethertype. These bits may be divided such that different sets of bits correspond to different types of information being conveyed. Three bits may be used for protocol type information, such as Ethernet, Token Ring, and so on. Two bits may be used for other format type information, such as DIX, 802.2, and so on, and four bits may be used for other feature information, such as turning on or off multicasting, promiscuous mode, and so on. Other divisions of the nine bits are also possible.

As another example, the values within the 0–1535 range of values that can be used in the Ethertype field to convey information other than Ethertype may be divided such that different groups of values convey different types of information being conveyed. The value 0 may be used to convey an intrinsic data type understood by the TCAs or the HCAs in a predetermined manner. The values 1–32 may be used to convey protocol type information, such as Ethernet, Token Ring, and so on. The values 33–64 may be used to convey other feature information, such as turning on or off multicasting, promiscuous mode, and so on. Other divisions of the values within the 0–1535 are also possible.

Method

Figure 5:
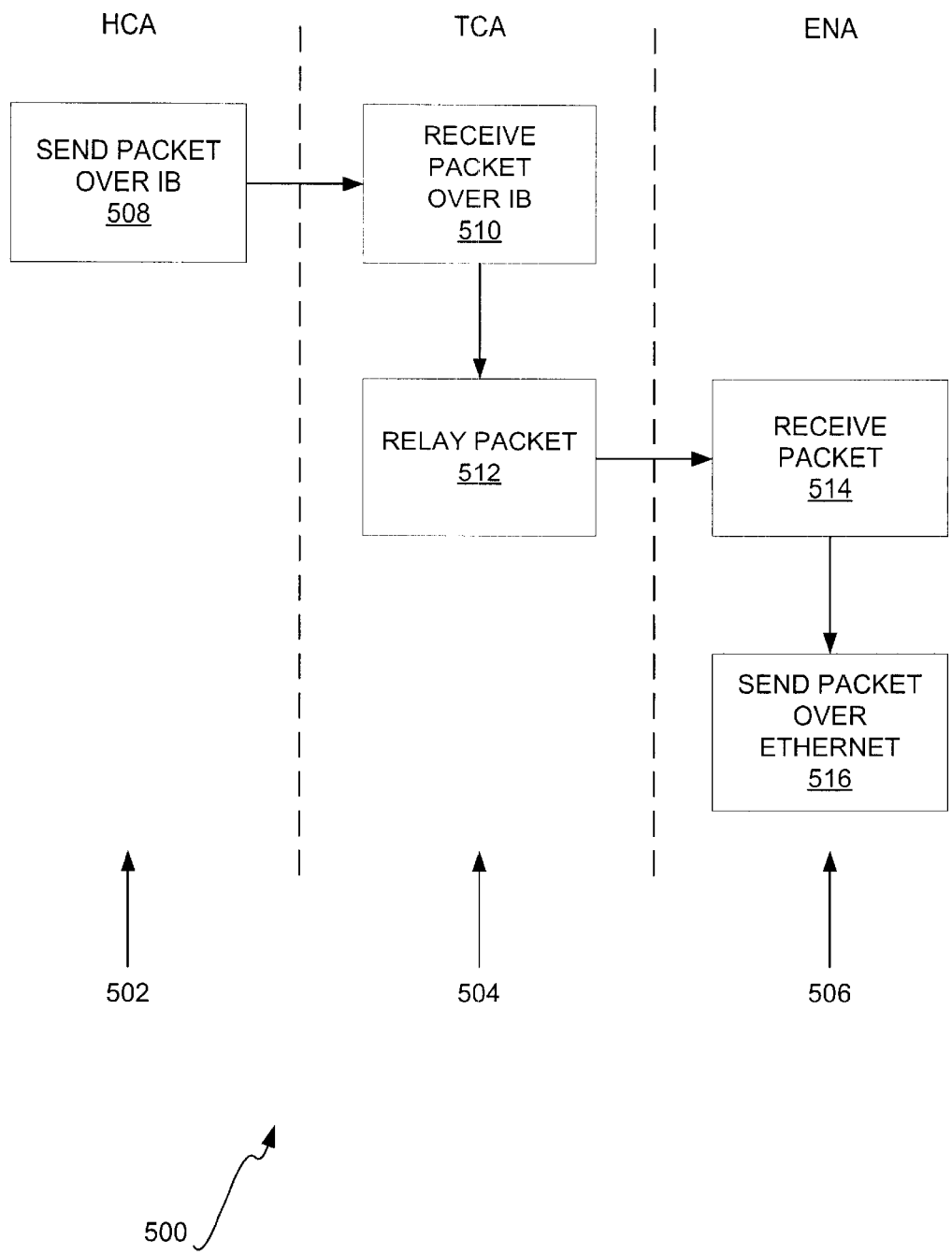
FIG. 5 is a flowchart of a method according to a preferred embodiment of the invention.

FIG. 5 is a flowchart of a method 500 summarizing the approach followed by the preferred embodiment of the invention. The parts of FIG. 5 are variously performed by an HCA, a TCA, and an Ethernet network adapter, as indicated by the columns 502, 504, and 506, respectively. The HCA sends a packet intended for the TCA over the InfiniBand network (508). The packet is in accordance with the packet ordering 300 of FIG. 3 that has been described, where the LRH 302 specifies the intended TCA, the RWH 304 stores a value other than what is intended by the InfiniBand standard to be stored to convey other information, and so on.

The TCA then receives the packet sent by the HCA (510). The TCA removes the LRH 302 and the RWH 304 from the InfiniBand packet, and relays the remaining raw datagram, or packet, to the Ethernet network adapter (512). The Ethernet network adapter receives this packet (514), and sends it over the Ethernet communication network (516). By standardizing the suggested Ethernet values, the TCAs and the drivers at the host computer may also be constructed generically to set data formats and device configuration parameters, such as turning on or off multicasting, promiscuous mode, and so on, using the RWH 304.

Advantages over the Prior Art

Embodiments of the invention allow for Ethernet or other communication networks to be bridged with InfiniBand or other I/O networks without necessitating a new packet structure. This is preferably accomplished by reusing the Ethertype field of the raw header to convey packet information other than Ethertype information. By comparison, prior art bridging approaches require new packet structures to be created, such that existing packets must be wrapped inside new packets.

Furthermore, without using embodiments of the invention, non-802.3 Ethernet data cannot be successfully bridged with InfiniBand networks in accordance with the InfiniBand specification without creating a new protocol. The new protocol would have to be embedded according to one of the InfiniBand transport and related header schemes that are supported by the TCAs and the host computer. Finally, debugging is aided by using embodiments of the invention, because network sniffers or other known technology can be employed to determine the format of the packets being transmitted over the InfiniBand network, based on the alternative values used in the Ethertype field.

Embodiments of the invention also compare favorably and are distinguishable from LAN Emulation (LANE) over Asynchronous Transfer Mode (ATM). LANE over ATM is not used for bridging one type of network, such as an I/O network, with another type of network, such as a communication network. LANE over ATM rather is used only for emulating certain types of communication networks over ATM. Differing embodiments of the invention allow configuration parameters to be set through the Ethertype field, whereas LANE over ATM, because it is centered and operating on a single host, does not provide for this. Furthermore, the LANE over ATM topology does not include an Ethernet or Token Ring network card, since the focus is on emulation, in distinction to embodiments of the invention.

Other Alternative Embodiments

It will be appreciated that, although specific embodiments of the invention have been described herein for purposes of illustration, various modifications may be made without departing from the spirit and scope of the invention. Fields in existing packet structures other than the Ethertype field of a raw header may also be used. Types of information other than SNAP header, LLC header, and the other types of information described can also be conveyed in the Ethertype or other type of field.

The approach of the invention is applicable to other InfiniBand network transport modes, too, such as reliable or unreliable connections or datagrams. In these instances, the inventive approach described can be used to standardize control and data messages exchanged between HCAs and TCAs. The invention is also applicable to other networks, such as other communication and I/O networks, than those described herein. Accordingly, the scope of protection of this invention is limited only by the following claims and their equivalents.

I claim:

1. A method for receiving a packet of data from a first adapter by a second adapter over a first network for routing over a second network, comprising:

receiving the packet of data by the second adapter from the first adapter over the first network, the packet of data having at least a first part intended to signify a type of the packet of data but actually conveying other information regarding the packet of data; and, routing the packet of data by the second adapter over the second network.

2. The method of claim 1, wherein the first part of the packet of data is intended to have a value greater than or equal to a predetermined number to signify the type but actually has a value less than the predetermined number to convey the other information.

3. The method of claim 1, wherein the first network comprises an InfiniBand network.

4. The method of claim 3, wherein the first adapter is a host channel adapter (HCA) and the second adapter is a target channel adapter (TCA).

5. The method of claim 1, wherein the second network comprises a communication network.

6. The method of claim 5, wherein the communication network comprises at least one of an Ethernet network and an 802.2 local area network (LAN).

7. The method of claim 6, wherein the first part of the packet of data is a raw datagram header having a field intended to signify the type but actually conveys the other information.

8. The method of claim 7, wherein the field is a two-octet field.

9. The method of claim 7, wherein the field is an Ether-type field.

10. The method of claim 1, wherein routing the packet of data by the second adapter over the second network comprises relaying the packet of data by the second adapter to a third adapter directly coupled to the second adapter and communicatively coupled to the second network.

11. A computerized system comprising:

an InfiniBand input/output (I/O) network;

a host channel adapter (HCA) coupled to the InfiniBand I/O network and capable of sending raw datagram headers for routing over a communication network that have a field intended to have a value greater than or equal to a predetermined number to signify a data packet type but having a value less than the predetermined number to convey other data packet information;

a target channel adapter (TCA) coupled to the InfiniBand I/O network and capable of receiving the raw datagram headers sent by the HCA; and, a network adapter coupled to the communication network and to the TCA and capable of routing the raw datagram headers received by the TCA over the communication network.

12. The system of claim 11, wherein the InfiniBand I/O network comprises one or more subnets.

13. The system of claim 11, wherein the InfiniBand I/O network comprises one or more switches and a plurality of InfiniBand links, a first of the plurality of InfiniBand links coupling the HCA to a first of the one or more switches, and a second of the plurality of InfiniBand links coupling the TCA to a second of the one or more switches.

14. The system of claim 11, wherein the communication network comprises at least one of an Ethernet network and an 802.2 local area network (LAN), and the network adapter comprises at least one of an Ethernet network adapter and an 802.2 LAN network adapter.

15. An article comprising:

a computer-readable signal-bearing medium; and, means in the medium for preparing a raw datagram header for transportation through an input/output (I/O) network for ultimate routing over a communication network and having a field intended to signify a data packet type but actually conveying other data packet information.

16. The article of claim 15, wherein the I/O network comprises an InfiniBand network.

17. The article of claim 15, wherein the communication network comprises at least one of an Ethernet network and an 802.2 local area network (LAN).

18. The article of claim 15, wherein the field is intended to have a value greater than or equal to a predetermined number to signify the data packet type but actually has a value less than the predetermined number to convey the other data packet information.

19. The article of claim 15, wherein the medium is a recordable data storage medium.

20. The article of claim 15, wherein the medium is a modulated carrier signal.

\* \* \* \* \*